US011138508B2

(12) United States Patent
Guha et al.

(10) Patent No.: US 11,138,508 B2
(45) Date of Patent: Oct. 5, 2021

(54) DEVICE AND METHOD FOR IDENTIFYING CAUSAL FACTORS IN CLASSIFICATION DECISION MAKING MODELS USING SUBJECTIVE JUDGEMENT

(71) Applicant: Wipro Limited, Bangalore (IN)

(72) Inventors: Ramasubramanian Guha, Bangalore (IN); Kartheek Palepu, Bangalore (IN); Randeep Raghu, Bangalore (IN)

(73) Assignee: Wipro Limited, Bangalore (IN)

( * ) Notice: Subject to any disclaimer, the term of this patent is extended or adjusted under 35 U.S.C. 154(b) by 1239 days.

(21) Appl. No.: 15/461,243

(22) Filed: Mar. 16, 2017

(65) Prior Publication Data

US 2018/0218274 A1 Aug. 2, 2018

(30) Foreign Application Priority Data

Feb. 1, 2017 (IN) .............................. 201741003777

(51) Int. Cl.
*G06N 5/02* (2006.01)
*G06N 5/00* (2006.01)
(Continued)

(52) U.S. Cl.
CPC ............. *G06N 5/025* (2013.01); *G06N 5/003* (2013.01); *G06N 5/022* (2013.01); *G06N 20/10* (2019.01);
(Continued)

(58) Field of Classification Search
CPC ........ G06N 20/00; G06N 20/10; G06N 20/20; G06N 5/00; G06N 5/003; G06N 5/02; G06N 5/022; G06N 5/025
See application file for complete search history.

(56) References Cited

U.S. PATENT DOCUMENTS

2002/0052858 A1  5/2002  Goldman et al.
2014/0279760 A1  9/2014  Aliferis et al.
(Continued)

FOREIGN PATENT DOCUMENTS

WO  WO2014/078692 A1 *  5/2014  ............. G06F 17/00

OTHER PUBLICATIONS

R. Guha, "Fraud Control Using Bigdata Analytics: Demystifying Machine Learning Black Boxes for Greater Transparency—A Case for Building Causal Factor Prediction—Part I", Sep. 15, 2016, *Wipro*, 4 pages.

*Primary Examiner* — Shane D Woolwine
(74) *Attorney, Agent, or Firm* — Finnegan, Henderson, Farabow, Garrett & Dunner, LLP

(57) ABSTRACT

Embodiment of the present disclosure discloses method and device for obtaining at least one influencing causal factor based on expert subjective judgement. Initially, first relative weightage values of plurality of predefined causal factors associated with each of one or more decision trees of classification in decision-making model is determined. Decision space is determined for classification based on first relative weightage values and base hypothesis associated with classification. The decision space is mapped with expert subjective judgment provided by expert user for classification. Error value associated with classification is determined based on mapping. Base hypothesis of classification is optimized such that optimized base hypothesis corresponds to minimum value of error value. Influencing causal factor from plurality of predefined causal factors are obtained by performing ensemble technique using optimized base hypothesis.

21 Claims, 4 Drawing Sheets

(51) Int. Cl.
*G06N 20/10* (2019.01)
*G06N 20/20* (2019.01)
*G06N 20/00* (2019.01)

(52) U.S. Cl.
CPC ............... *G06N 20/20* (2019.01); *G06N 5/00* (2013.01); *G06N 20/00* (2019.01)

(56) References Cited

U.S. PATENT DOCUMENTS

| | | | |
|---|---|---|---|
| 2015/0254562 A1* | 9/2015 | Rogers ................... | G06N 20/00 706/11 |
| 2016/0036844 A1 | 2/2016 | Kopp et al. | |
| 2016/0300252 A1* | 10/2016 | Frank ................ | G06F 16/24578 |

* cited by examiner

DEVICE AND METHOD FOR IDENTIFYING CAUSAL FACTORS IN CLASSIFICATION DECISION MAKING MODELS USING SUBJECTIVE JUDGEMENT

TECHNICAL FIELD

The present subject matter is related in general to the field of automated decision-making model, more particularly, but not exclusively to a method and device for obtaining at least one influencing causal factor for a classification of a decision-making model based on expert subjective judgement.

BACKGROUND

Decision-making models relate to prediction of classifications through an automated computer system and are configured to be trained through supervised learning. The decision-making models implement various algorithms to predict the classifications. The algorithms may be implemented in form of decision trees. The decision trees use a tree-like graph or model of decisions and their possible consequences to output the associated classification. The decision tree may include nodes and branches. Internal nodes of the decision trees may represent a test on an attribute associated with the decision-making model and each branch may represent outcome of the test. Leaf nodes of the decision trees may represent the classification, also referred as, a class label which may be decision taken after computing all attributes at the internal nodes. Paths from root of the decision trees to the leaf nodes of the decision trees may be referred as classification rules. The decision-making model may also include plurality of causal factors based on which the classifications may be obtained. Each of the classification may be having an influencing causal factor out of the plurality of causal factors.

Present day decision-making models are black box models where users may be aware only of transfer characteristics of the decision-making models i.e., inputs and outputs associated with the decision-making models. However, knowledge of internal working of the decision-making models may not be known to the users. Also, lack of business process insight relating to the decision-making models may make investigation of the decision-making models difficult. There exist one or more systems to unbox the black box decision-making models by which the users may be able to understanding the internal working of the decision-making models.

One of the existing systems discloses a method of converting decision-making models to functionally equivalent model which may be implemented and deployed easily or efficiently in practice. This is achieved by generating input patterns using statistical sampling and by monitoring response variable of the decision-making model by application of Markov boundaries. Other existing systems relates to construction of a quantitative model of the decision-making model which may be useful in automatic decision-making and process control and for process simulation and study. The system includes converting user input into at least one cell having inputs and outputs and generating relationships which are associable with said cells via one of said inputs and outputs. Data set is analysed to be modelled to assign quantitative values to said relationships and to associate said quantitative values with said associated inputs and outputs, thereby to generate a quantitative model. However, the existing systems do not disclose to provide influencing causal factor for the decision-making model which may be desired by the user. Also, the existing systems do not disclose mapping of the decision-making model to an expert knowledge by which the influencing factors may be identified. Also, the system does not disclose to optimize the decision-making process based on the user input.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for obtaining at least one influencing causal factor for a classification of a decision-making model based on expert subjective judgement. The method includes, initially, determining first relative weightage values of plurality of predefined causal factors associated with each of one or more decision trees of a classification in a decision-making model. Upon determining the first relative weightage values, a decision space is determined for the classification based on the first relative weightage values and base hypothesis associated with the classification. Further, the decision space is mapped with expert subjective judgment provided by an expert user for the classification. Error value associated with the classification is determined based on the mapping. Further, the base hypothesis of the classification is optimized such that the optimized base hypothesis corresponds to minimum value of the error value. The at least one influencing causal factor is obtained by performing ensemble technique using the optimized base hypothesis.

In an embodiment, the present disclosure relates to a decision monitoring device for obtaining at least one influencing causal factor for a classification of a decision-making model based on expert subjective judgement. The decision monitoring device includes a processor and a memory communicatively coupled to the processor. The memory stores processor-executable instructions which on execution cause the processor to, initially, determine first relative weightage values of plurality of predefined causal factors associated with each of one or more decision trees of a classification in a decision-making model. Upon determining the first relative weightage values, a decision space is determined for the classification based on the first relative weightage values and base hypothesis associated with the classification. Further, the decision space is mapped with expert subjective judgment provided by an expert user for the classification. Error value associated with the classification is determined based on the mapping. Further, the base hypothesis of the classification is optimized such that the optimized base hypothesis corresponds to minimum value of the error value. The at least one influencing causal factor is obtained by performing ensemble technique using the optimized base hypothesis.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
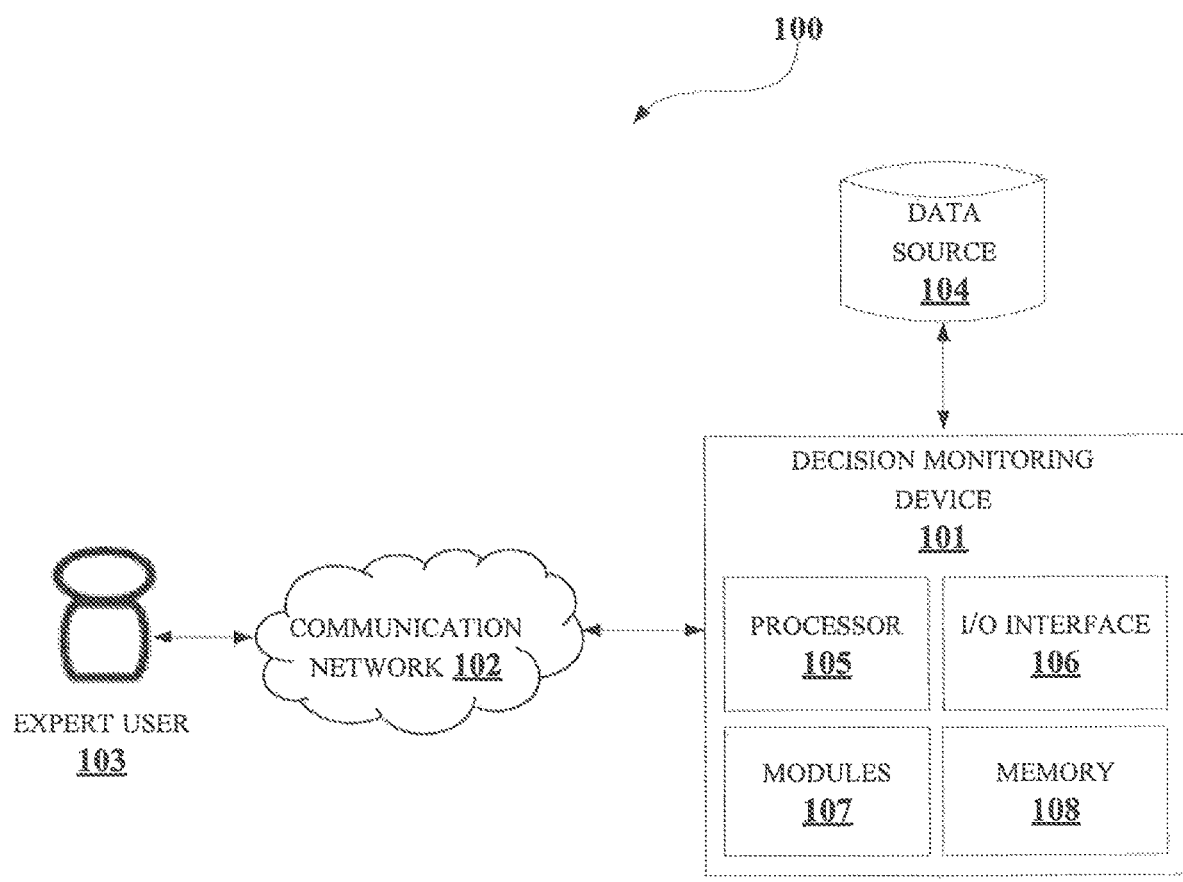
FIG. 1 illustrates an exemplary environment for obtaining at least one influencing causal for a classification of a decision-making model based on expert subjective judgement in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a decision monitoring device and a method for obtaining at least one influencing causal for a classification of a decision-making model based on expert subjective judgment. The expert subjective judgement may be obtained from an expert user associated with the decision-making model for a classification of the decision-making model. The present disclosure may also disclose to identify a decision-making process associated with the classification. The method for obtaining the at least one influencing causal factor includes determining first relative weightage values of the plurality of predefined causal factors associated with each of one or more decision trees of the classification. A decision space, which may be discernible through the expert subjective judgement, may be determined for the classification based on the first relative weightage values and base hypothesis associated with the classification. The decision space may be mapped with expert subjective judgment provided by an expert user for the classification to determine error value associated with the classification. Further, the base hypothesis of the classification may be optimized such that the optimized base hypothesis corresponds to minimum value of the error value. The at least one influencing causal factor may be obtained by performing ensemble technique using the optimized base hypothesis.

FIG. 1 illustrates exemplary environment for obtaining the at least one influencing causal for the classification of the decision-making model in accordance with some embodiments of the present disclosure.

As shown in FIG. 1, the environment 100 may include a decision monitoring device 101, a communication network 102 and a data source 104 associated with the decision monitoring device 101. An expert user, associated with the decision monitoring device 101, may be provisioned to provide expert subject judgement to the decision monitoring device 101 via the communication network 102. The decision monitoring device 101 may be configured to obtain at least one influencing causal factor based on the expert subjective judgement obtained from the expert user 103 for a classification of the decision-making model. In an embodiment, the decision monitoring device 101 may be configured to obtain one or more expert subjective judgements from one or more expert users for a classification (not shown in figure). In an embodiment, the one or more expert subjective judgement may be for plurality of classifications of the decision-making model (not shown in the figure).

The data source 104 may be associated with the decision-making model. In an embodiment, the data source 104 may store one or more information associated with the decision-making model, which may include, but not limited to, one or more classifications, one or more decision trees, base hypothesis for each of the one or more classifications, plurality of predefined causal factors and so on. In an embodiment, the expert subjective judgement from the expert user 103 may also be stored in the data source 104. The decision monitoring device 101 may retrieve the one or more information from the data source 104 for obtaining at least one influencing causal factors. In an embodiment, the decision monitoring device 101 may retrieve the one or more information directly from the decision-making model.

The decision monitoring device 101 may include a processor 105, an Input/Output (I/O) interface 106, one or more modules 107 and memory 108. In some embodiment, the memory 108 may be communicatively coupled to the processor 105. The memory 108 stores processor executable instructions, which, on execution, may cause the decision monitoring device 101 to optimize the decision-making model. The method of the decision monitoring device 101 may include determining first relative weightage values of the plurality of predefined causal factors associated with each of the one or more decision trees of the classification. In an embodiment, the predefined causal factors may be, but not limited to, occurrence in path associated with the classification, Gini coefficient at each node split of the one or more decision trees and distance from terminal nodes of the one or more decision trees.

The first relative weightage values may indicate importance of each of the plurality of predefined causal factors with respect to each of the one or more decision trees. In an embodiment, the first relative weightage values may be determined based on importance of attributes at nodes of each of the one or more decision trees. In an embodiment, the importance for the attributes may be assigned by identifying additional factors at each node split of the one or more decision trees. The additional factors include, but not limited to, decrease in impurity of node achieved at each split, check of terminal node created at the node split, check of the classification resulted in identifying rarer class and level of the corresponding decision tree that utilized the node split.

Upon determining the first relative weightage values, the decision space may be determined based on the first weightage values and the base hypothesis of the classification. The base hypothesis includes second relative weightage values of each of the one or more decision trees. In an embodiment, the base hypothesis may be retrieved from the data source 104 associated with the decision monitoring device 101. In an embodiment, the second relative weightage may indicate weightage values of each of the one or more decision trees in relation to each other. In an embodiment, the second relative weightage values may be based on performance, accuracy and position and use of the plurality of predefined causal factors, associated with each of the one or more decision trees.

The determined decision space includes importance value of each of the plurality of predefined causal factors. In an embodiment, the decision space may be determined by multiplying the first relative weightage values and the base hypothesis. In an embodiment, the decision space is determined such that the decision space may be discernible through the expert subjective judgement. In an embodiment, the decision space may be of same format as that of the expert subjective judgement.

Further, the decision space may be mapped with the expert subjective judgment provided by the expert user 103 for the classification to determine error value associated with the classification. In an embodiment, the mapping of the decision space with the expert subjective judgement may be achieved because the decision space may be discernible through the expert subjective judgement. In an embodiment, one or more techniques, known to a person skilled in art, may be implemented for performing the mapping of the decision space with the expert subjective judgment. In an embodiment, the expert user 103 may provide the expert subjective judgement through a user interface (not shown in the figure) associated with the decision monitoring device 101. The expert subjective judgement may indicate importance value of each of the predefined causal factors provided by the expert user 103. In an embodiment, the expert user 103 may be any person associated with the decision-making model. The determined error value may be difference associated with the decision space and the expert subjective judgement.

Further, the base hypothesis of the classification may be optimized such that the optimized base hypothesis corresponds to minimum value of the error value. In an embodiment, optimization of the base hypothesis may be achieved by performing regression modelling of the base hypothesis. In an embodiment, the regression modelling may be based on number of plurality of predefined causal factors associated with the decision-making model. In an embodiment, the regression modelling may be performed by using one or more strategies, known to a person skilled in art. By optimizing the base hypothesis, the second weightage values of each of the one or more decision trees may be varied to minimize the error value. In an embodiment, the optimized base hypothesis may be stored in the data source 104 as the base hypothesis, which may be retrieved for further processing by the decision monitoring device 101.

The at least one influencing causal factor may be obtained by performing ensemble technique using the optimized base hypothesis. One or more ensemble techniques, known to a person skilled in art, may be performed for obtaining the at least one influencing causal factors. In an embodiment, the at least one influencing causal factor may be obtained based on the optimized base hypothesis obtained for one or more classifications associated with the decision-making model. In an embodiment, the ensemble technique includes considering votes from multiple decision-making models. Each of the multiple decision-making models is built on different samples of training data. In an embodiment, ensemble technique may be Bagging technique, where 'N' number of decision models are built on different samples and final decision for obtaining the at least one influencing causal factor is considered by the aggregation of all the 'N' models.

Further, in an embodiment, the decision monitoring device 101 may be configured to identify decision-making process of the decision-making model based on the optimized base hypothesis. The decision-making process may be identified by one or more techniques known to the person skilled in the art.

Figure 2:
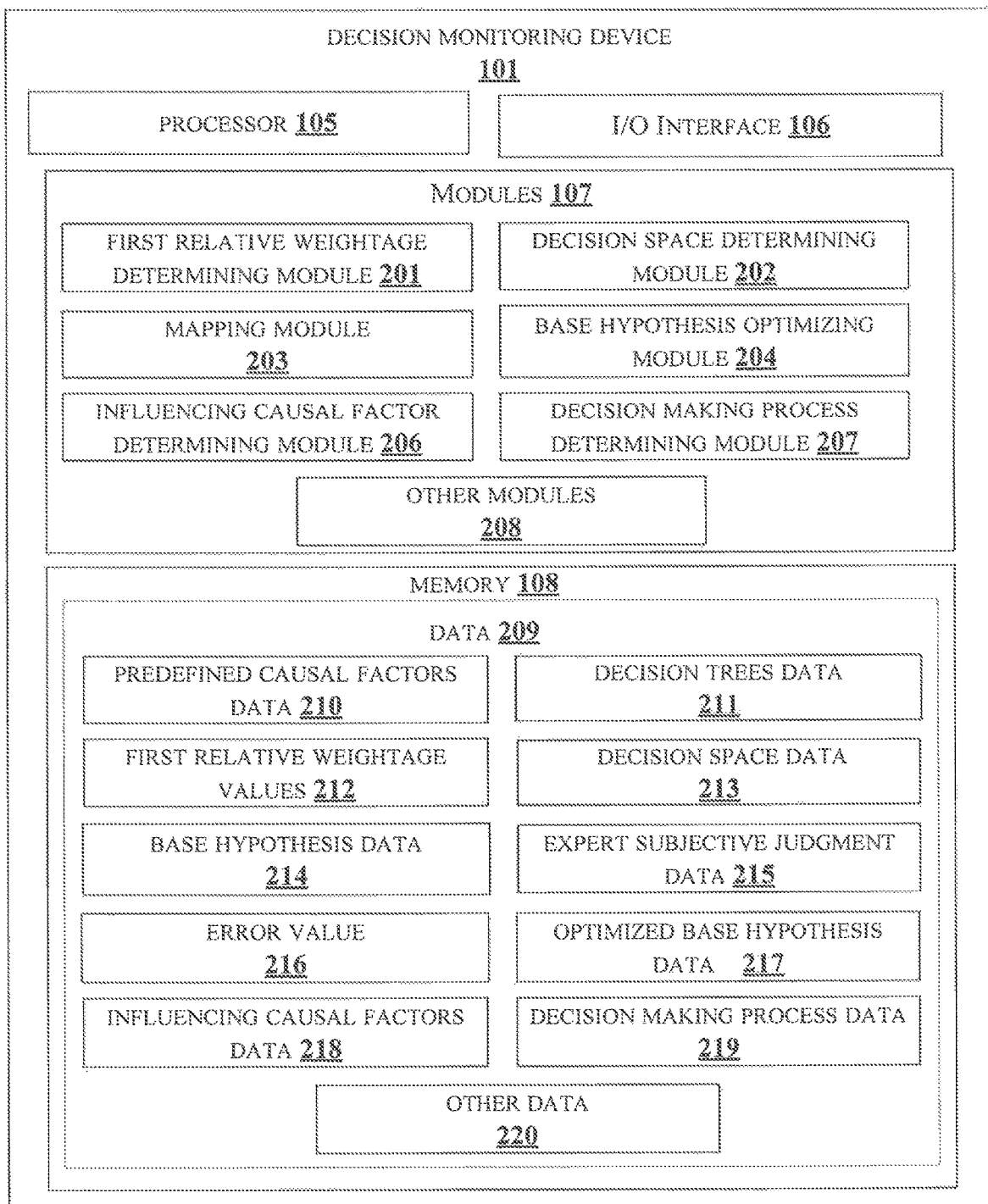
FIG. 2 shows a detailed block diagram of decision monitoring device in accordance with some embodiments of the present disclosure.

FIG. 2 shows a detailed block diagram of the decision monitoring device 101 in accordance with some embodiments of the present disclosure. Data 209 in the memory 108 and one or more modules 107 of the decision monitoring device 101 may be described herein in detail.

In one implementation, the one or more modules 107 may include, but not limited to, a first relative weightage determining module 201, a decision space determining module 202, a mapping module 203, a base hypothesis optimizing module 204, an influencing causal factor determining module 206, a decision-making process determining module 207 and one or more other modules 208 associated with the decision monitoring device 101.

In an embodiment, data 209 in the memory 108 may include predefined causal factors data 210 (also referred as the plurality of predefined causal factors 210), decision trees data 211 (also referred as the one or more decision trees 211), the first relative weightage values 212, decision space data 213 (also referred as the decision space 213), base hypothesis data 214 (also referred as the base hypothesis 214), expert subjective judgement data 215 (also referred as the expert subjective judgement 215), error value 216, optimized base hypothesis data 217 (also referred as the optimized base hypothesis), influencing causal factor data 218 (also referred as at least one influencing causal factor 218) and decision-making process data 219 (also referred as the decision-making process 219) and other data 220 associated with the decision monitoring device 101.

In an embodiment, the data 209 in the memory 108 may be processed by the one or more modules 107 of the decision monitoring device 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

For obtaining the at least one influencing causal factors, initially, the first relative weightage values 212 of the plurality of predefined causal factors 210 associated with each of one or more decision trees 211 may be determined by the first relative weightage determining module 201. In an embodiment, the plurality of predefined causal factors 210 may be, but not limited to, the occurrence in path associated with the classification, the Gini coefficient at each node split of the one or more decision trees and the distance from terminal nodes of the one or more decision trees. Consider an example of a decision-making model including one or more decision trees 211, with a scenario to determine fraud in an insurance claim of a vehicle. The plurality of predefined causal factors 210 may include remaining days for expiry of the insurance claim, First Information Report (FIR) location and age of driver of the vehicle. The first relative weightage values 212 may indicate importance of each of the plurality of predefined causal factors 210 with respect to each of the one or more decision trees 211. In an embodiment, the first weightage values may be determined by aggregating importance of attributes at nodes of each of the one or more decision trees. In the example described previously, the first relative weightage 212 values may be determined for each of the predefined causal factors, i.e., the remaining days for expiry of the insurance claim, the FIR location and the age of driver of the vehicle for each of the one or more decision trees.

In an embodiment, the first relative weightage values 212 may be in form of matrix as illustrated in matrix 1.

$$\begin{array}{c} \phantom{F1}\ D1\ \ D2\ \ D3\ \ \ldots\ \ Dn \\ \begin{array}{c}F1\\F2\\F3\end{array}\begin{bmatrix}0.7 & 0.9 & 0.6 & & 0.5\\ 0.3 & 0.2 & 0.5 & \ldots & 0.3\\ 0.1 & 0.05 & 0.1 & & 0.2\end{bmatrix} \end{array} \quad (1)$$

where,
F1, F2 and F3 of matrix 1 indicate the plurality of predefined causal factors of the decision-making model to determine fraud in the insurance claim. Here, consider F1 to be the remaining days for expiry of the insurance claim, F2 to be the FIR location and F3 to be the age of driver of the vehicle; and D1, D2, D3, . . . . Dn indicate the one or more decision trees associated with the classification of the decision-making model to determine fraud in the insurance claim.

Here, each of the plurality of predefined causal factors may be assigned first relative weightage values 212 for each of the one or more decision trees. In an embodiment, the matrix 1 may be referred to as an attribute vector.

Upon determining the first relative weightage values 212, the decision space 213 may be determined, by the decision space determining module 202, based on the first relative weightage values 212 and the base hypothesis 214 of the classification. The base hypothesis 214 may include the second relative weightage values of each of the one or more decision trees. In an embodiment, the second relative weightage may indicate the weightage values of each of the one or more decision trees, relative to each other. The second relative weightage values in the decision space 213 may be based on the performance, the accuracy and the position and the use of the plurality of predefined causal factors, associated with each of the one or more decision trees.

In an embodiment, the base hypothesis 214 may be in form of a matrix as illustrated in matrix 2.

$$W \quad \begin{array}{c}D1\\D2\\D3\\\vdots\\Dn\end{array}\begin{bmatrix}0.6\\0.5\\0.7\\\vdots\\0.4\end{bmatrix} \quad (2)$$

where,
D1, D2, D3, . . . . Dn indicate the one or more decision trees associated with the classification of the decision-making model to determine fraud in the insurance claim; and
W indicates the second relative weightage values of each of the one or more decision trees.

In an embodiment, the matrix 2 may be referred to as a mapping vector.

The determined decision space 213 may include the importance value of each of the plurality of predefined causal factors. From the example described previously, the decision space 213 may be the importance value of each of the predefined causal factors which may be the remaining days for expiry of the insurance claim, the FIR location and the age of driver of the vehicle for each of the one or more decision trees, relative to each other. In an embodiment, the decision space 213 may be determined by multiplying the first relative weightage values 212 and the base hypothesis 214.

In an embodiment, the decision space 213 may be in form of a matrix as illustrated in matrix 3.

$$I1 \quad \begin{array}{c}F1\\F2\\F3\end{array}\begin{bmatrix}0.6\\0.5\\0.3\end{bmatrix} \quad (3)$$

where,
F1, F2 and F3 of matrix 3 indicate the plurality of predefined causal factors of the decision-making model to determine fraud in the insurance claim; and I1 indicates the importance value of each of the plurality of predefined causal factors.

From matrix 3, it may be understood that causal factor of the remaining days for expiry of the insurance claim may be of higher importance in the decision-making model and the age of driver of the vehicle may be of least importance in the decision-making model.

Further, the decision space 213 may be mapped, by the mapping module 203, with the expert subjective judgment provided by the expert user 103 for the classification to determine error value 216 associated with the classification. In an embodiment, one or more techniques, known to a person skilled in art, may be implemented for performing the mapping of the decision space 213 and the expert subjective judgment. The expert subjective judgement may indicate importance value of each of the predefined causal factors provided by the expert user 103.

In an embodiment, the expert subjective judgement may be in form of a matrix as illustrated in matrix 4

$$I2 \quad\quad (4)$$
$$\begin{array}{c} F1 \\ F2 \\ F3 \end{array} \begin{bmatrix} 0.5 \\ 0.7 \\ 0.2 \end{bmatrix}$$

where,
F1, F2 and F3 of matrix 4 indicate the plurality of predefined causal factors of the decision-making model to determine fraud in the insurance claim; and
I2 indicates the importance value of each of the plurality of predefined causal factors provided by the expert user.

From matrix 4, it may be understood that the FIR location may be most important causal factor for the expert user.

In an embodiment, the expert subjective judgement i.e., the matrix 4 may be referred as codified domain knowledge vector.

In an embodiment, the mapping may output an error function associated with the decision space 213 and the expert subjective judgement. The error function may be as indicated in equation 5.

Decision space+Error value=Expert subjective judgement    (5)

In an embodiment, the decision space 213 and the expert subjective judgement may be vectors associated with the corresponding matrix illustrated previously.

The error value 216 may be difference associated with the decision space 213 and the expert subjective judgement. For the example illustrated previously, the error value 216 may be the difference between the matrix 3 and the matrix 4.

Upon determining the error value 216, the base hypothesis 214 of the classification may be optimized, by the base hypothesis optimizing module 204, such that the optimized base hypothesis 217 corresponds to minimum value of the error value 216. In an embodiment, regression modelling is performed on the base hypothesis 214 to achieve the optimization. In an embodiment, the regression modelling may be based on number of plurality of predefined causal factors associated with the decision-making model. For the previously illustrated example, the regression modelling may be performed on matrix 2. The regression modelling is performed to derive a trend line to best fit data which may be the second relative weightage values. The trend line is positioned to reduce prediction error as much as possible. In an embodiment, linear regression may be performed for the regression modelling. In the linear regression, a line with equation y=mx+c is to be drawn between 'Y' (dependent variable) and 'X' (single independent variable). The aim is to find the values of 'm' and 'c' that helps in best fitting the data.

By optimizing the base hypothesis 214, the second weightage values of each of the one or more decision trees may be varied to minimize the error value 216. The error value 216 may be minimized to the minimum value of the error value 216. In an embodiment, to minimize the error value 216, the equation 5 may be considered as a sequence of 'n' separate linear regression problems for n dimensions, where 'n' indicates the number of plurality of predefined causal factors.

The at least one influencing causal factor may be obtained by performing ensemble technique using the optimized base hypothesis 217. The influencing causal factor determining module 206 may be configured to identify the at least one influencing causal factor 218 from the plurality of predefined causal factors. In an embodiment, the ensemble technique may be performed by the ensemble technique performing module, associated with the decision monitoring device 101. In an embodiment, the at least one influencing causal factor may be obtained based on the optimized base hypothesis 217 obtained for one or more classifications associated with the decision-making model.

In an embodiment, the decision-making process determining module 207 may be configured to identify decision-making process 219 of the decision-making model. The decision-making process 219 may be identified by one or more techniques known to the person skilled in the art. In an embodiment, the at least one influencing causal factor 218 and the decision-making process 219 may be identified by decrypting the optimized base hypothesis. In an embodiment, the at least one influencing causal factor 218 and the decision-making process may be provided to the expert user 103. In the present disclosure, paths followed by each data point in the decision-making model is analysed to identify the one or more influencing causal factors. This helps in unboxing the decision-making model. In an embodiment, the path of every data point is tracked by counting occurrence of the plurality of predefined causal factors in the decision-making model. Once the decision space comprising weights of the plurality of predefined causal factors are obtained, mapping of the expert subjective judgement is performed to come up with weights that are more like expert judgement.

The other data 220 may store data, including temporary data and temporary files, generated by modules for performing the various functions of the decision monitoring device 101. The one or more modules 107 may also include other modules 208 to perform various miscellaneous functionalities of the decision monitoring device 101. It will be appreciated that such modules may be represented as a single module or a combination of different modules.

Figure 3:
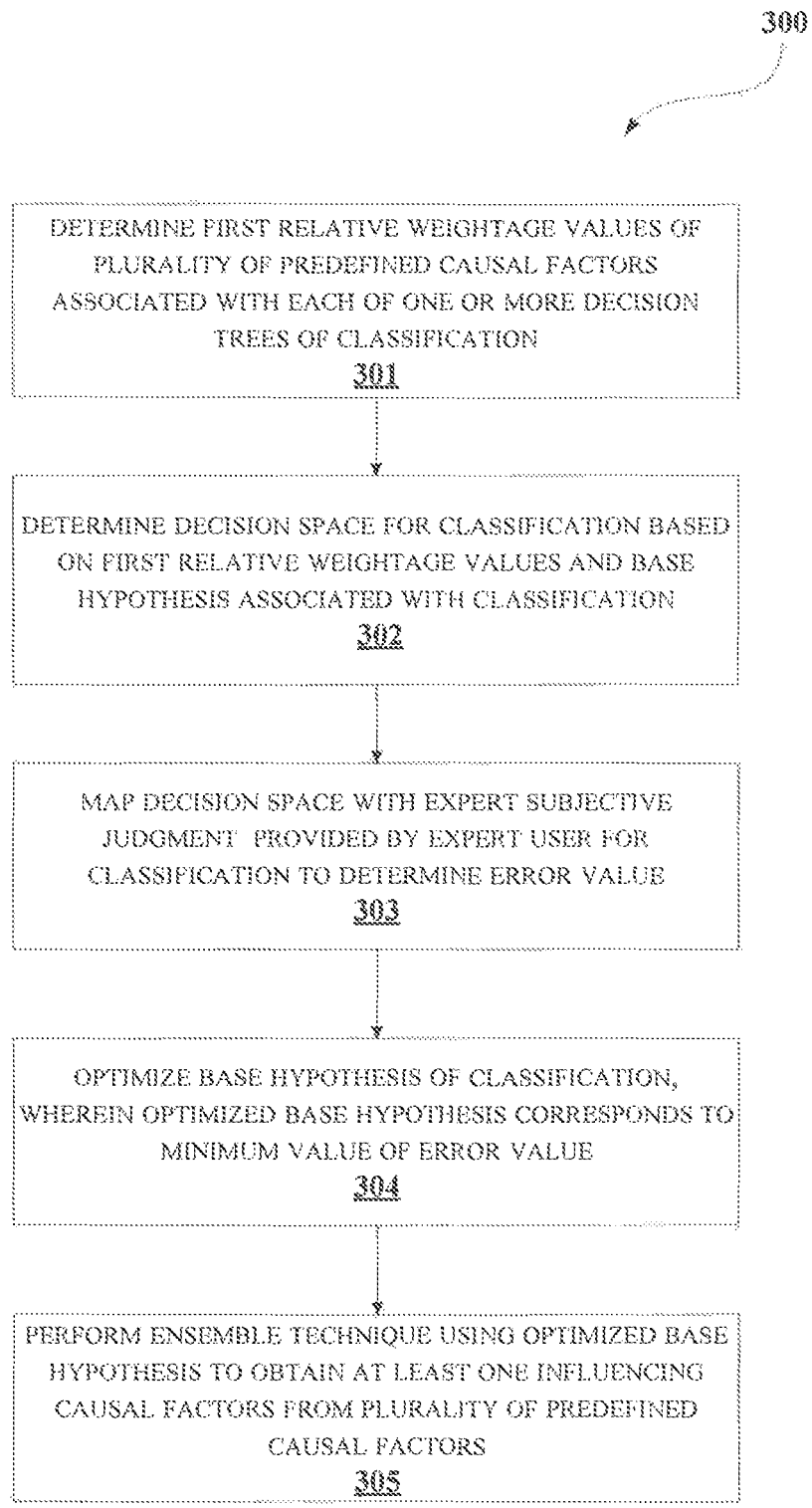
FIG. 3 illustrates a flowchart showing a method for obtaining at least one influencing causal for a classification of a decision-making model in accordance with some embodiments of present disclosure.

FIG. 3 illustrates a flowchart showing a method for obtaining the at least one influencing causal factor based on expert subjective judgement in accordance with some embodiments of present disclosure.

As illustrated in FIG. 3, the method 300 may include one or more blocks for executing processes in the decision monitoring device 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the first relative weightage values determining module 201 determines the first relative weightage values 212 of the plurality of predefined causal factors associated with each of the one or more decision trees of the classification. In an embodiment, the first relative weightage values may be determined by using one or more aggregation techniques to each of the one or more decision trees. The aggregation technique may include aggregation of importance of each attribute associated with each of the one or more decision trees.

At block 302, decision space determining module 202 determines the decision space 213 for the classification based on the first relative weightage values 212 and the base hypothesis 214 associated with the classification. The decision space 213 includes the importance value of each of the plurality of predefined causal factors. The base hypothesis 214 includes the second relative weightage values of each of the one or more decision trees.

At block 303, the mapping module 203 maps the decision space 213 with the expert subjective judgement provided by the expert user 103 for the classification. The error value 216 associated with the classification may be determined based on the mapping. In an embodiment, the error value 216 indicates the difference between the decision space 213 and the expert subjective judgement.

At block 304, the base hypothesis optimizing unit 204 optimizes the base hypothesis 214 based on the regression modelling. The optimized base hypothesis 217 corresponds to minimum value of the error value 216.

At block 305, the influencing causal factor determining module 206 is configured to perform the ensemble technique based on the optimized base hypothesis to obtain the at least one influencing causal factors. In an embodiment, the optimized base hypothesis 217 may correspond to the at least one influencing causal factors.

COMPUTING SYSTEM

Figure 4:
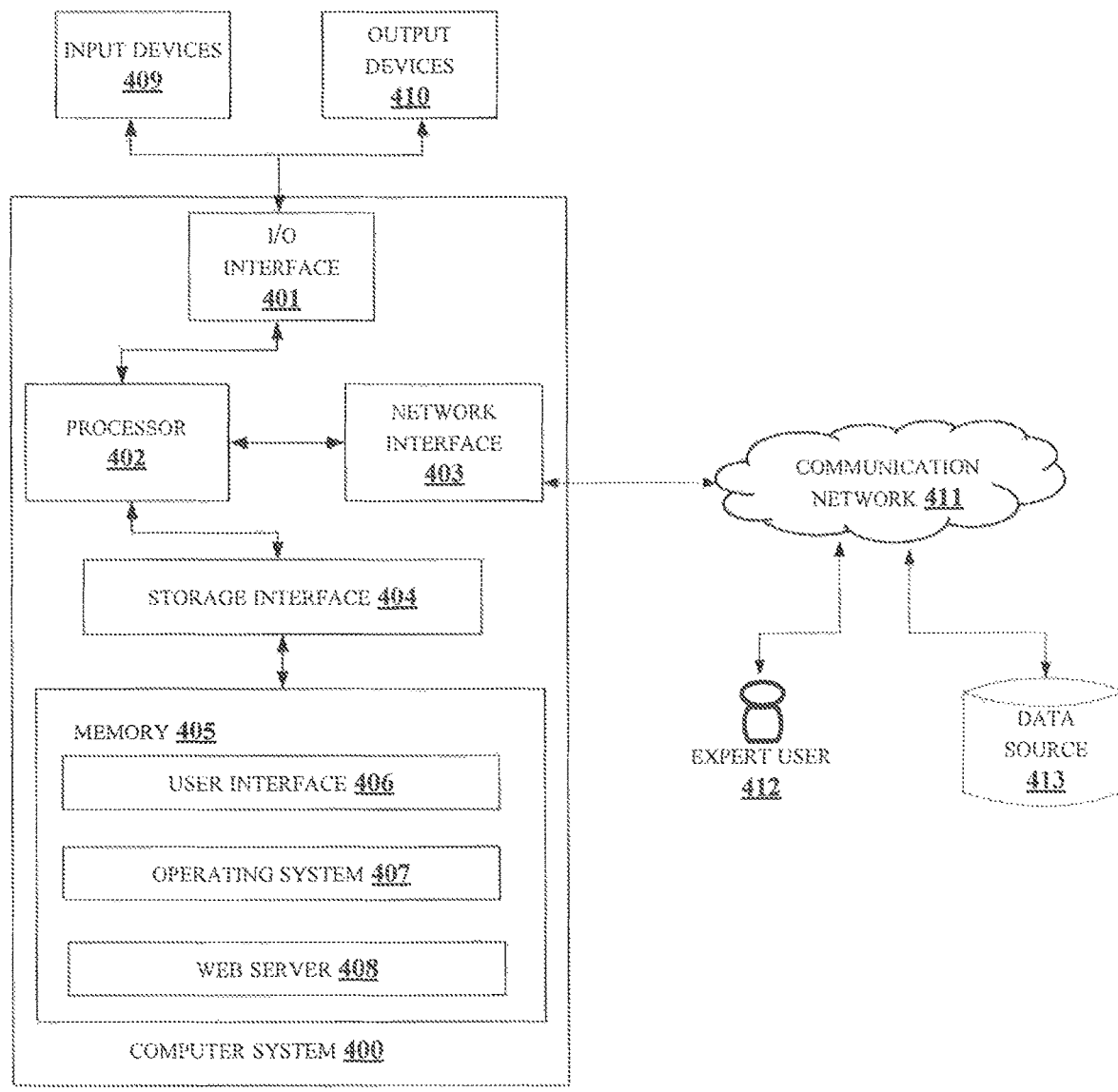
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the decision-monitoring device 101. The computer system 400 may include a central processing unit ("CPU" or "processor") 402. The processor 402 may include at least one data processor for executing processes in Virtual Storage Area Network. The processor 402 may include specialized processing units such as, integrated system (bus) controllers, memory management control units, floating point units, graphics processing units, digital signal processing units, etc.

The processor 402 may be disposed in communication with one or more input/output (I/O) devices 409 and 410 via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices 409 and 410. For example, the input devices 409 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 410 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 consists of a decision monitoring device 101. The processor 402 may be disposed in communication with the communication network 411 via a network interface 403. The network interface 403 may communicate with the communication network 411. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 411 may include, without limitation, a direct interconnection, local area network (LAN), wide area network (WAN), wireless network (e.g., using Wireless Application Protocol), the Internet, etc. Using the network interface 403 and the communication network 411, the computer system 400 may communicate with an expert user 412 and a data source 413 for obtaining at least one influencing causal factors. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 411 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data 406, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure discloses an efficient method for optimizing a decision-making model by using an expert subjective judgement.

An embodiment of present disclosure provides influencing causal factor from plurality of predefined causal factors associated with the classification based on the expert subjective judgement with are domain specific.

An embodiment of the present disclosure provides influencing causal factor by which the user will be aware of the factors that led to make the decision.

An embodiment of the present disclosure provides influencing causal factor by which investigation team can just investigate the reasons for the factors influencing in case of fraud-detection.

An embodiment of the present disclosure provides influencing causal factor when in case of fraud detection, the expert user can build a threshold around the most common causal factors to improve their market.

An embodiment of the present disclosure provides less time to identify the influencing causal factors.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Decision monitoring unit |
| 102 | Communication network |
| 103 | Expert user |
| 104 | Data source |
| 105 | Processor |
| 106 | I/O interface |
| 107 | Modules |
| 108 | Memory |
| 201 | First relative weightage determining module |
| 202 | Decision space determining module |
| 203 | Mapping module |
| 204 | Base hypothesis optimizing module |
| 206 | Influencing causal factor determining module |
| 207 | Decision-making process determining module |
| 208 | Other modules |
| 209 | Data |
| 210 | Predefined causal factors |
| 211 | Decision trees |
| 212 | First relative weightage values |
| 213 | Decision space |
| 214 | Base hypothesis |
| 215 | Expert subjective judgement data |
| 216 | Error value |
| 217 | Optimized base hypothesis |
| 218 | Influencing causal factor |
| 219 | Decision-making process |
| 220 | Other data |
| 400 | Computer System |
| 401 | I/O Interface |
| 402 | Processor |
| 403 | Network Interface |
| 404 | Storage Interface |
| 405 | Memory |
| 406 | User Interface |
| 407 | Operating System |
| 408 | Web Server |
| 409 | Input Devices |
| 410 | Output Devices |
| 411 | Communication Network |
| 412 | Expert user |
| 413 | Data source |

We claim:

1. A method for obtaining at least one influencing causal factor for a classification of a decision-making model based on expert subjective judgment, comprising:
   determining, by a decision monitoring device, first relative weightage values of a plurality of predefined causal factors associated with each of one or more decision trees of a classification in a decision-making model;
   determining, by the decision monitoring device, a decision space for the classification based on the first relative weightage values and a base hypothesis associated with the classification;
   mapping, by the decision monitoring device, the decision space with expert subjective judgment provided by an expert user for the classification to determine an error value associated with the classification;
   optimizing, by the decision monitoring device, the base hypothesis of the classification, wherein the optimized base hypothesis corresponds to minimum value of the error value; and
   performing, by the decision monitoring device, one or more ensemble techniques using the optimized base hypothesis to obtain at least one influencing causal factor from the plurality of predefined causal factors for the classification.

2. The method as claimed in claim 1, further comprising determining, by the decision monitoring device, a decision-making process for the classification of the decision-making model based on the optimized base hypothesis.

3. The method as claimed in claim 1, wherein the plurality of predefined causal factors comprises an occurrence in path associated with the classification, Gini coefficient at each node split of the one or more decision trees, and distance from terminal nodes of the one or more decision trees.

4. The method as claimed in claim 1, wherein the decision space comprises an importance value of each of the plurality of predefined causal factors.

5. The method as claimed in claim 1, wherein the base hypothesis comprises second relative weightage values of each of the one or more decision trees, wherein the second relative weightage values is based on performance, accuracy, position, and use of the plurality of predefined causal factors associated with each of the one or more decision trees.

6. The method as claimed claim 1, wherein the expert subjective judgment comprises an importance value of each of the one or more predefined causal factor provided by the expert user.

7. The method as claimed in claim 1, wherein the optimizing the base hypothesis comprises performing regression modelling of the base hypothesis based on number of the plurality of predefined causal factors.

8. A decision monitoring device for obtaining at least one influencing causal factor for a classification of a decision-making model, comprising:
   a processor; and
   a memory communicatively coupled to the processor, wherein the memory stores processor-executable instructions, which, on execution, cause the processor to:
      determine first relative weightage values of a plurality of predefined causal factors associated with each of one or more decision trees of a classification in a decision-making model;
      determine a decision space for the classification based on the first relative weightage values and a base hypothesis associated with the classification;

map the decision space with expert subjective judgment provided by an expert user for the classification to determine an error value associated with the classification;

optimize the base hypothesis of the classification, wherein the optimized base hypothesis corresponds to minimum value of the error value; and perform one or more ensemble techniques using the optimized base hypothesis to obtain at least one influencing causal factor from the plurality of predefined causal factors for the classification.

9. The decision monitoring device as claimed in claim 8, further comprising the processor to determine a decision-making process for the classification of the decision-making model based on the optimized base hypothesis.

10. The decision monitoring device as claimed in claim 8, wherein the plurality of predefined causal factors comprises an occurrence in path associated with the classification, Gini coefficient at each node split of the one or more decision trees, and distance from terminal nodes of the one or more decision trees.

11. The decision monitoring device as claimed in claim 8, wherein the decision space comprises an importance value of each of the plurality of predefined causal factors.

12. The decision monitoring device as claimed in claim 8, wherein the base hypothesis comprises second relative weightage values of each of the one or more decision trees, wherein the second relative weightage values is based on performance, accuracy, position, and use of the plurality of predefined causal factors associated with each of the one or more decision trees.

13. The decision monitoring device as claimed in claim 8, wherein the expert subject judgment comprises an importance value of each of the one or more predefined causal factors provided by the expert user.

14. The decision monitoring device as claimed in claim 8, wherein the optimizing the base hypothesis comprises performing regression modelling of the base hypothesis based on number of the plurality of predefined causal factors.

15. A non-transitory computer readable medium including instructions stored thereon that when processed by at least one processor cause a device to perform operations comprising:

determining first relative weightage values of a plurality of predefined causal factors associated with each of one or more decision trees of a classification in a decision-making model;

determining a decision space for the classification based on the first relative weightage values and a base hypothesis associated with the classification;

mapping the decision space with expert subjective judgment provided by an expert user for the classification to determine an error value associated with the classification;

optimizing the base hypothesis of the classification, wherein the optimized base hypothesis corresponds to minimum value of the error value; and performing one or more ensemble techniques using the optimized base hypothesis to obtain at least one influencing causal factor from the plurality of predefined causal factors for the classification.

16. The medium as claimed in claim 15, further comprising determining a decision-making process for the classification of the decision-making model based on the optimized base hypothesis.

17. The medium as claimed in claim 15, wherein the plurality of predefined causal factors comprises an occurrence in path associated with the classification, Gini coefficient at each node split of the one or more decision trees, and distance from terminal nodes of the one or more decision trees.

18. The medium as claimed in claim 15, wherein the decision space comprises an importance value of each of the plurality of predefined causal factors.

19. The medium as claimed in claim 15, wherein the base hypothesis comprises second relative weightage values of each of the one or more decision trees, wherein the second relative weightage values are based on performance, accuracy, position, and use of the plurality of predefined causal factors associated with each of the one or more decision trees.

20. The medium as claimed in claim 15, wherein the expert subject judgment comprises an importance value of each of the one or more predefined causal factors provided by the expert user.

21. The medium as claimed in claim 15, wherein the optimizing the base hypothesis comprises performing regression modelling of the base hypothesis based on number of the plurality of predefined causal factors.

* * * * *